Patented Feb. 10, 1925.

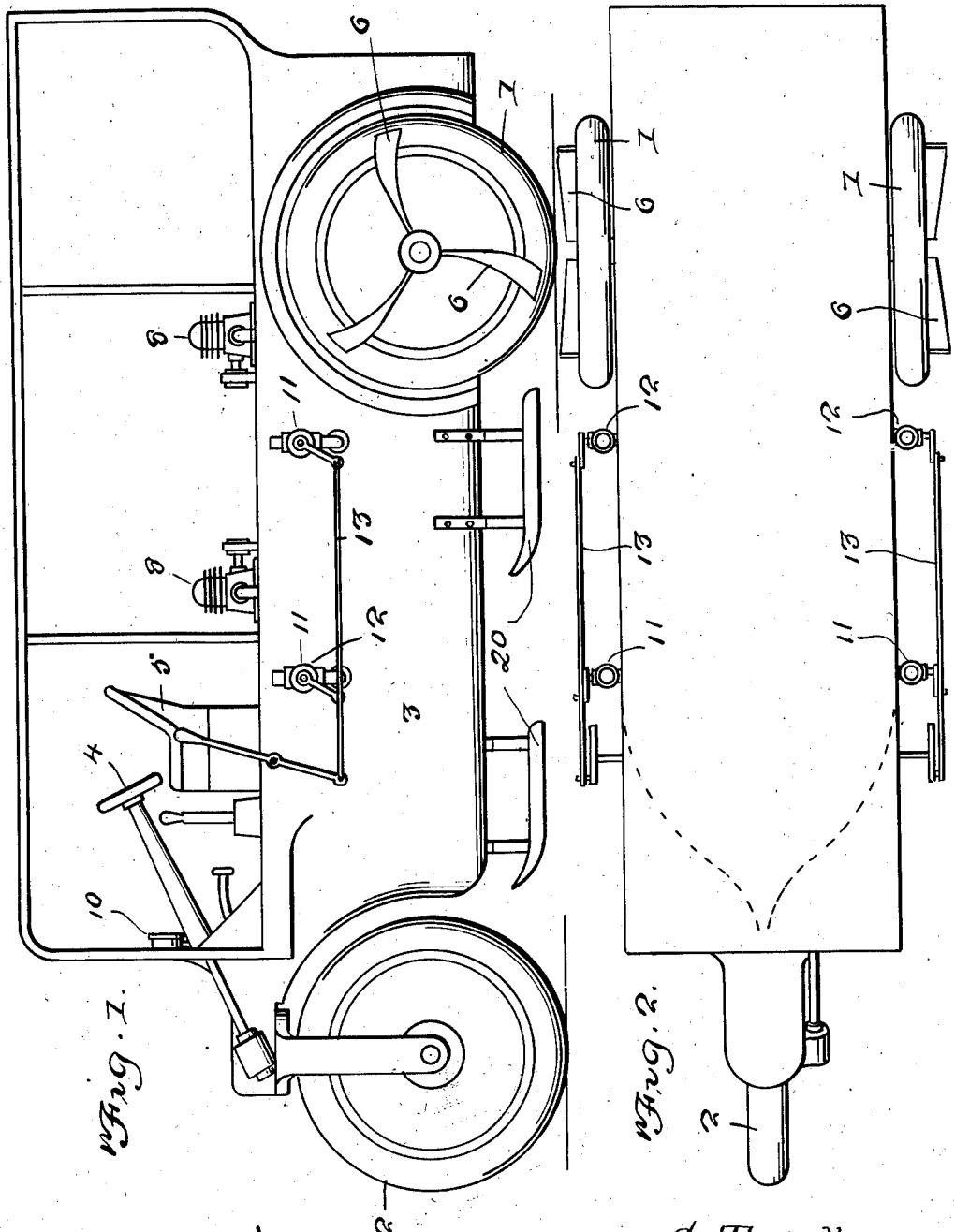

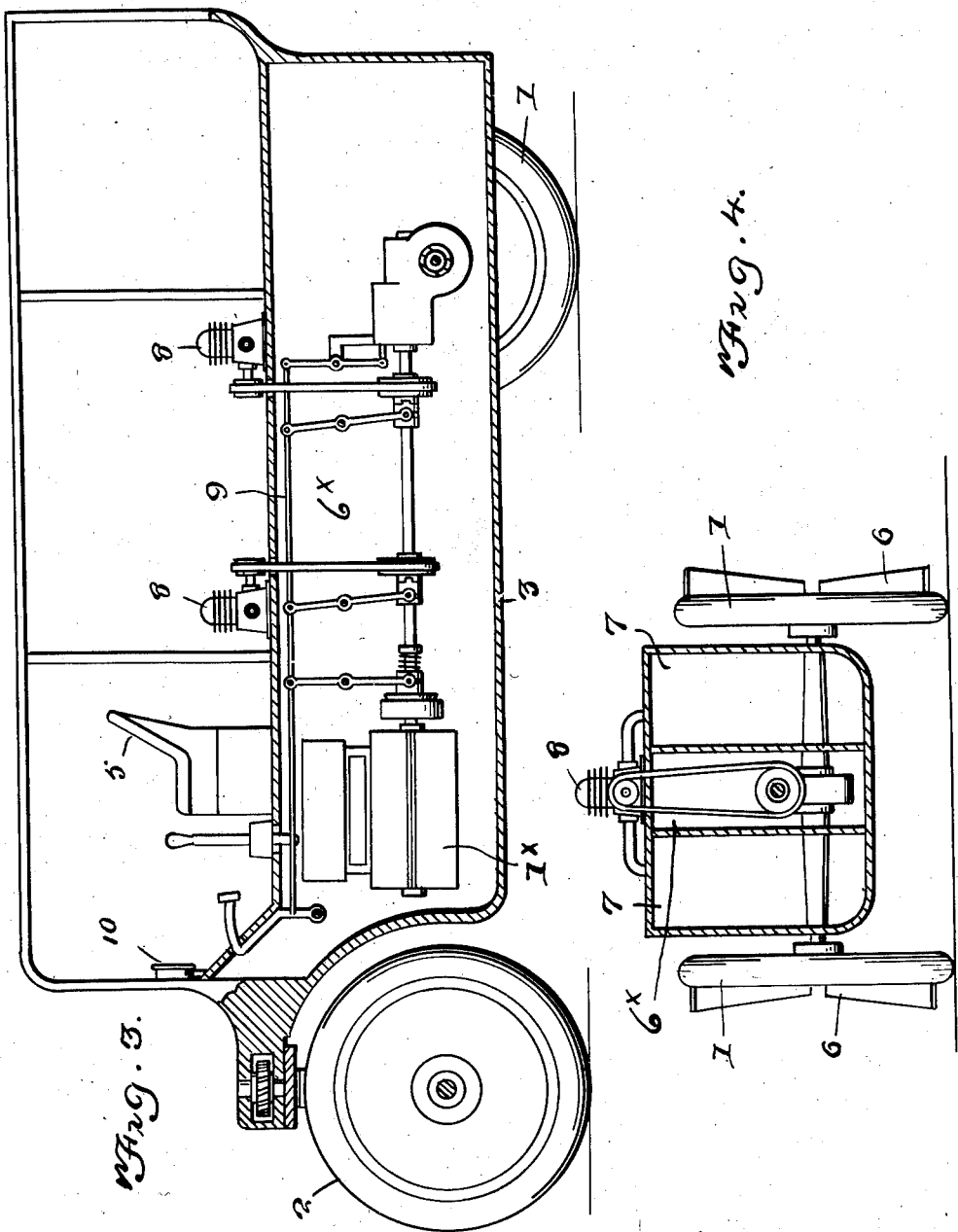

1,526,258

UNITED STATES PATENT OFFICE.

STEFAN TRASKY, OF JERSEY CITY, NEW JERSEY.

AUTOMOBILE.

Application filed March 1, 1924. Serial No. 696,352.

*To all whom it may concern:*

Be it known that I, STEFAN TRASKY, a citizen of Czechoslovakia, residing at Jersey City, in the county of Hudson and State of New Jersey, have invented new and useful Improvements in Automobiles, of which the following is a specification.

My present invention pertains to automobiles for use on land and in the water.
The object of the invention is the provision of a peculiarly characterized automobile which by virtue of the construction and relative arrangement of its elements is adapted to be handled to advantage on the land and in the water.

To the attainment of the foregoing, the invention consists in the improvement as hereinafter described and definitely claimed.

In the accompanying drawings, forming part of this specification:—

Figure 1 is a side elevation of the land and water automobile constituting the preferred embodiment of my invention.

Figure 2 is an inverted plan view of the same.

Figure 3 is a longitudinal vertical section of the automobile.

Figure 4 is a transverse section of the automobile.

Similar numerals of reference designate corresponding parts in all of the views of the drawings.

In the preferred embodiment of my invention, the automobile comprises two rear drive wheels 1, and a single front wheel 2; the wheel 2 being properly arranged and mounted at the forward end of a body 3 and being connected as shown with a steering wheel 14, positioned in the body 3 within convenient reach of a driver on an appropriate seat 5.

The wheels 1 and 2 are provided with pneumatic tires to render easy the travel of the automobile on land and to increase the buoyancy of the apparatus in the water, and the rear wheels 1 are designed to be driven by an appropriate engine $1^x$, preferably though not necessarily, of internal combustion type, carried in the longitudinal central portion of the body 3 and adapted to be controlled by the driver in the conventional or in any other approved manner.

The rear wheels 1 are each provided with three propelling wings 6 for use when the automobile is immersed in and is to be moved on a body of water. The said wings 6 are of the peculiar construction illustrated and are connected to the wheels 1 as best shown in Figure 4 in order that rotation of the said wheels will be attended by the propulsion of the automobile when the same is disposed in a body of water. Manifestly when the automobile is located on land the blades 6 will not interfere in any measure with the ordinary propulsion of the vehicle through the medium of the wheels 1.

The body 3 constitutes an important feature of my invention as will be appreciated when it is stated that in its lower portion the body is provided at opposite sides of the engine chamber $6^x$ with longitudinal chambers 7 in connection with a view to increasing the floatability of the automobile. The pumps 8 are connected with the engine $1^x$ in the manner best shown in Figure 3; a control mechanism 9 such as shown being provided in order that the driver may put the pumps 8 into or out of operation at will. I would also have it understood in this connection that the chambers 7 are equipped with—i. e., connected to a pressure gauge 10, located in the body 3 for the convenient examination of the driver; also, that the chambers 7 are provided with a plurality of vents 11, controlled by valves 12 which, in turn, are under the control of the driver through the control mechanism 13. This latter provision constitutes an important feature of my invention inasmuch as by permitting air under pressure to escape from the chamber 7 the degree to which the automobile extends down into the water may be increased by the driver when occasion demands.

For the purpose of enabling the automobile to travel with facility through snow, I provide the body 3 at its underside with broad-tread runners 20, Figure 1, the said runners 20 being disposed at opposite sides of the body 3 and adapted to bear on snow when the wheels sink into the same.

In the event of a wall of either chamber 7 being punctured it will be understood that operation of the pumps 8 and the maintenance of air under pressure in said chamber 7 will operate to keep the same clear of water.

It will be apparent from the foregoing that I have provided an automobile for land and water use as well as use in snow, embodying such a construction that while travelling on land the driver may adapt the automobile to float and travel through the water so that when a body of water is reached the automobile may be driven into and across the same without delay, and may then be driven from the water to land for travel on the latter in the ordinary well known manner.

Manifestly by virtue of the pumps 8 being connected with the chambers 7 and being under the control of the operator the automobile is rendered safe in water even when a wall of either chamber 7 is punctured.

Notwithstanding the practical advantages of my novel automobile as pointed out in the foregoing, it will be observed that the automobile is simple and inexpensive in construction, and, as a whole, is well adapted to withstand the usage to which automobiles are ordinarily subjected.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claim.

Having described my invention, what I claim and desire to secure by Letters-Patent, is:—

An automobile comprising a body having a longitudinal central chamber and also having chambers at opposite sides of the first-named chamber and adapted to contain air under pressure and render the automobile buoyant in water, an engine disposed in said longitudinal central chamber of the body, means operable by the engine for charging the side chambers with air under pressure, means under the control of the driver for putting said air compressing means into and out of operation, rear drive wheels connected with the body and operable by the engine through means under the control of the driver, water engaging propulsion means on the said drive wheels, and a steering wheel connected with the body and connected with and movable by manually-operable steering means in the body.

In testimony whereof I affix my signature.

STEFAN TRASKY.